(12) United States Patent
Scott et al.

(10) Patent No.: US 7,609,706 B2
(45) Date of Patent: *Oct. 27, 2009

(54) SYSTEM AND METHOD FOR CORRELATION OF DISSIMILAR TELECOMMUNICATION SIGNALING PROTOCOLS

(75) Inventors: Alistair Kenneth Clement Scott, Colorado Spring, CO (US); David John McDonald, Divide, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 948 days.

This patent is subject to a terminal disclaimer.

(21) Appl. No.: 10/792,099

(22) Filed: Mar. 3, 2004

(65) Prior Publication Data
US 2005/0195745 A1 Sep. 8, 2005

(51) Int. Cl.
*H04L 12/66* (2006.01)
*H04L 12/28* (2006.01)
*H04J 3/16* (2006.01)

(52) U.S. Cl. ............. 370/410; 370/465; 370/352

(58) Field of Classification Search .......... 370/389, 370/401, 352, 465, 466, 467, 395.5, 410, 370/426, 522, 524; 379/221.13, 201.01, 379/221.09, 210.02
See application file for complete search history.

(56) References Cited

U.S. PATENT DOCUMENTS 6,456,845 B1 *  9/2002  Drum et al. ............ 455/424
6,823,386 B1    11/2004  Crump et al.
6,839,342 B1 *  1/2005  Parham et al. ............ 370/352
6,865,266 B1 *  3/2005  Pershan .............. 379/221.13
7,054,325 B1 *  5/2006  Archibald ................ 370/410
7,085,279 B1 *  8/2006  Kumar et al. ............ 370/401
7,245,609 B2 *  7/2007  D'Eletto .................. 370/352
7,295,577 B2 * 11/2007  Moody et al. ............ 370/496
7,382,768 B2 *  6/2008  Doerr et al. ............. 370/352
2003/0214963 A1 11/2003  Moody
2005/0094623 A1 *  5/2005  D'Eletto .................. 370/352

FOREIGN PATENT DOCUMENTS

WO    WO 02/075556 A1    9/2002

OTHER PUBLICATIONS

Search Report from the UK Patent Office issued Jun. 14, 2005.

\* cited by examiner

*Primary Examiner*—Hanh Nguyen

(57) ABSTRACT

A system for correlating and displaying dissimilar communication protocols is disclosed. In one embodiment, the system comprises user communication information that spans at least two dissimilar communication protocols, a first communication protocol, and a second communication protocol. The system also comprises a software code segment configured to detect correlation data identifying a first call portion associated with the first communication protocol, and configured to detect correlation data identifying a second call portion associated with the second communication protocol, where the correlation data comprises components relating to the first communication protocol and the second communication protocol, and wherein the correlation data is detected in real time.

21 Claims, 13 Drawing Sheets

290

Correlation
Message Header

Correlation
Structure

SYSTEM AND METHOD FOR CORRELATION OF DISSIMILAR TELECOMMUNICATION SIGNALING PROTOCOLS

BACKGROUND

Existing telecommunications networks, such as the public switched telephone network (PSTN) are typically configured so that equipment (such as switches) in the transmission, or bearer network, which carries user traffic (voice, video, and data signals), is co-located with equipment (such as signaling points) in the associated signaling network, which carries control signals for coordinating the operation of the bearer network.

However, telecommunications networks are migrating to a distributed architecture in which the equipment that carries user traffic is separated from the equipment that provides signaling functionality. Furthermore, a modern communication network typically comprises dissimilar networks that are coupled together. Such dissimilar networks can include, for example, the PSTN coupled to a packet network. These dissimilar networks generally employ different bearer technologies and/or signaling protocols.

Dissimilar telecommunications networks are typically interconnected via a "gateway" which provides the necessary conversions or adaptations between the bearer traffic and signaling protocol in each of the networks. In such an architecture an adaptation device, such as a media gateway (MG) (sometimes referred to as a "trunk gateway") can be used to couple the dissimilar networks. A control device, such as a media gateway controller (MGC), provides control functionality over the media gateway, but need not be co-located with the media gateway. Generally, the media gateway passes voice and data information. A media gateway controller can communicate with one or more media gateways using a gateway control protocol, such as, for example, simple gateway control protocol (SGCP), media gateway control protocol (MGCP), Internet Protocol Device Control (IPDC), and H.218.

Typically, a media gateway and a media gateway controller are each coupled to both a PSTN and a packet network. The media gateway controller may communicate with other media gateway controllers over the PSTN using extensions of current call control protocols such as Signaling System No. 7 ISDN User Part (SS7 ISUP), Session Initiation Protocol (SIP—IETF RFC 2543), ITU Recommendation H.323, or Bearer Independent Call Control (BICC). New protocols may be defined for this interface in the future.

A media gateway controller communicates with a media gateway using, for example, MGCP. Accordingly, the media gateway does receive signaling messages, but they are from the media gateway controller. In addition, multiple media gateways may communicate with each other using what is referred to as a "gateway-to-gateway" protocol. Examples of gateway-to-gateway protocols are H.323 and the SIP protocol. Alternatively, other non-standard gateway-to-gateway protocols may be used, depending on the manufacturer of the media gateway.

When user traffic, such as a telephone call occurring between a node located in the PSTN and a node located in the packet network, spans the dissimilar communication networks, the user traffic is identified differently by the two communication networks.

Further, today's modern telephony and internet Protocol (IP) multiple service networks use a variety of protocols to provide many different functions to enable delivery of services to network users. Protocol monitoring applications, such as those that enable tracing across a signaling network the protocol messages associated with a call, or building a call data record (CDR) to summarize the key parameters relating to user traffic (i.e., a telephone call), require the ability to map call identifiers across different protocols, which may refer to a single entity in multiple different, inconsistent ways.

Therefore, it would be desirable to have a network analysis device that is capable of correlating two or more different communication signaling protocols relating to the same user traffic in a communication network that comprises at least two dissimilar communication networks, or two dissimilar communications signaling protocols within one communication network, and that displays this information in real time to a user of the network analysis device.

SUMMARY

Embodiments of the invention include a system for correlating in real time dissimilar communication signaling protocols, comprising user communication information carried over a network, where the user communication information is characterized by at least two dissimilar communication protocols, a first communication protocol, and a second communication protocol. The system also comprises a software code segment configured to detect correlation data identifying a first call portion associated with the first communication protocol, and configured to detect correlation data identifying a second call portion associated with the second communication protocol, where the correlation data comprises components relating to the first communication protocol and the second communication protocol, and wherein the correlation data is detected in real time.

Other systems, methods, computer readable media, and features of the invention will be or become apparent to one with skill in the art upon examination of the following drawings and detailed description. It is intended that all such additional systems, methods, computer readable media, and features, be included within this description, be within the scope of the present invention, and be protected by the accompanying claims.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

DETAILED DESCRIPTION

The network analysis system in accordance with embodiments of the invention can be implemented in software (e.g., firmware), hardware, or a combination thereof. In one embodiment, the network analysis system for correlating dissimilar communication signaling protocols is implemented using a dedicated test platform (such as a SUN workstation available from SUN Microsystems) having a dedicated processor, preferably executing the UNIX operating system. However, regardless of the manner of implementation, the software portion of the system for correlating dissimilar communication signaling protocols can be executed by a special or general-purpose computer, such as a personal computer (PC; IBM-compatible, Apple-compatible, or otherwise), workstation, minicomputer, or mainframe computer. Furthermore, the invention may be implemented in other processing or computing devices, such as, for example but not limited to, a palmtop computer, a personal data assistant (PDA), or any other piece of network analysis equipment, etc.

Figure 1:
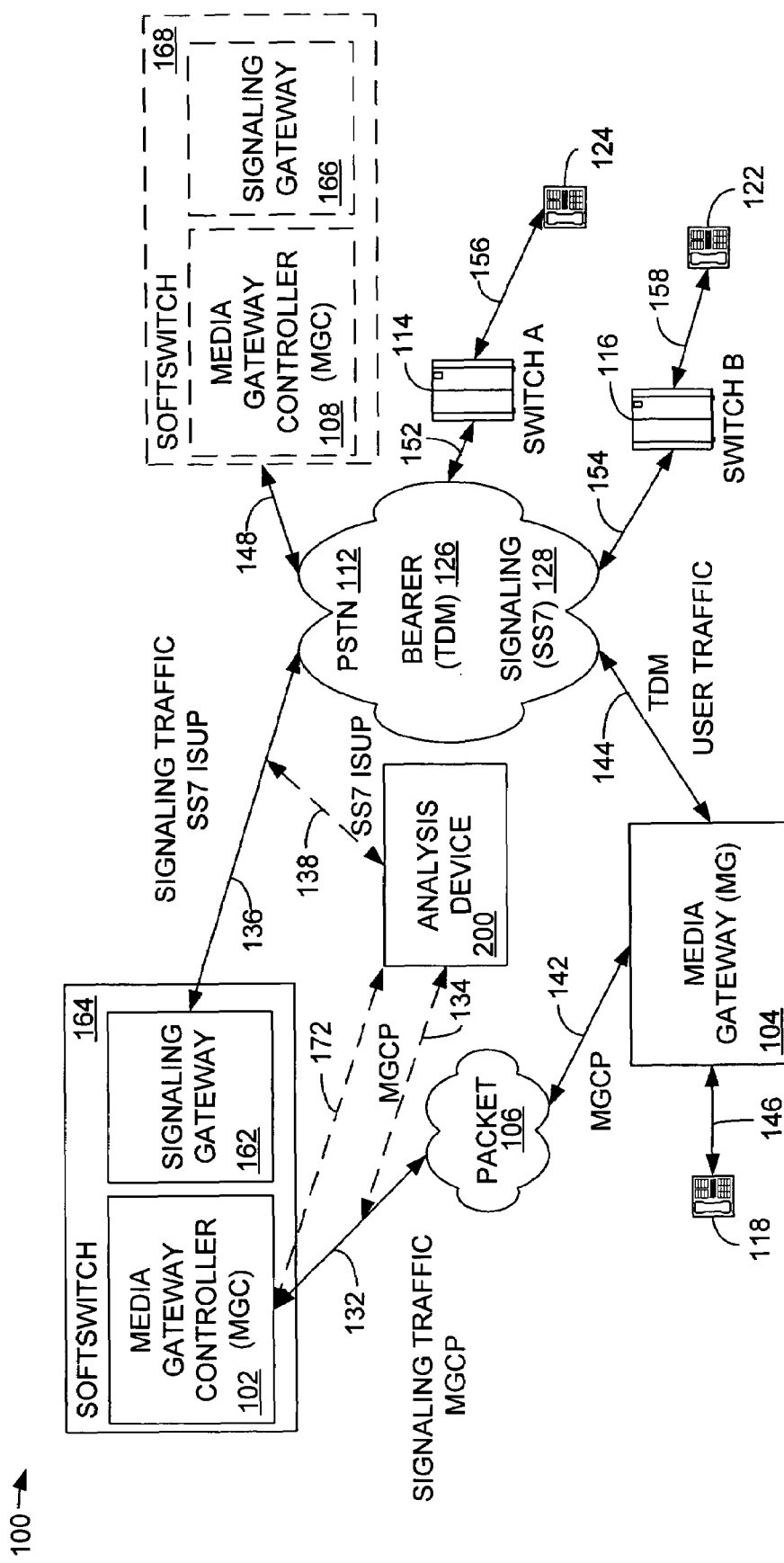
FIG. 1 is a schematic view illustrating an exemplar communication environment in which the network analysis device of the invention resides.

FIG. 1 is a schematic view illustrating an exemplary communication environment 100 in which embodiments of the invention reside. The communication environment 100 generally includes two dissimilar communication networks, a packet network 106 and a public switched telephone network (PSTN) 112. The PSTN 112 generally includes a bearer portion 126, over which user traffic, such as a telephone call using time division multiplexed (TDM) is communicated, and a signaling portion 128, over which signaling traffic, such as SS7 traffic, is carried. As will be described in detail below, embodiments of the invention apply generally to the signaling portion 128 of the PSTN 112. The packet network 106 can be, for example, an asynchronous transfer mode (ATM) network, an internet protocol (IP), or any other packet switching network.

The communication environment 100 also includes a media gateway controller (MGC) 102, which, when coupled with a signaling gateway 162, is sometimes referred to as a "softswitch" 164. The MGC 102 communicates with an MG 104 via the packet network 106 and communication lines 132 and 142. The signaling gateway 162 communicates with the PSTN 112 via connection 136. The media gateway controller 102 may also be coupled, via the PSTN 112, to one or more other media gateway controllers, an exemplar one of which is illustrated using reference numeral 108. Further, although not shown in FIG. 1, two MGCs may communicate over the packet network 106 using, for example, the SIP protocol. The media gateway 104 also couples to the PSTN 112 via connection 144.

A first switch (switch A) 114 couples to the PSTN 112 via connection 152 and a second switch (switch B) 116 couples to the PSTN 112 via connection 154. The switches 114 and 116, are typically part of the PSTN 112, and are typically located at telephone company central offices (not shown). For exemplary purposes only, a telephone 124 couples to switch 114 via connection 156 and a telephone 122 couples to switch 116 via connection 158. The connections 156 and 158 can be any type of communication channel that typically couples a telephone to a telephone company central office, and is typically a copper wire pair.

A phone 118 also couples to the media gateway 104 via connection 146. For example, the phone 118 can be an Internet phone. As known to those having ordinary skill in the art, both user traffic and signaling information typically traverse both the packet network 106 and the PSTN 112. The links 136 and 148 typically carry PSTN signaling traffic, such as signaling system seven (SS7) integrated services digital network user part (ISUP) or telephone user part (TUP) signaling messages. The connections 132, 142 typically carry packet network signaling traffic in the form of packets constructed using the media gateway control protocol (MGCP).

User traffic, for example a telephone call, that might occur between telephones 118 and 124 typically traverses communication links 146, 144, 152 and 156. Unfortunately, because the call traverses both the packet network 106 (communication line 146) and the PSTN 112 (communication lines 144, 152 and 156), the user traffic (telephone call) is identified by two different communication protocols. Alternatively, the call may traverse a single communication network, but may still be characterized by two or more dissimilar communication protocols. The packet portion of the call signaling is identified using the MGCP protocol, while the PSTN portion of the call signaling is identified using the SS7 ISUP protocol.

For example, a call setup message in the SS7 ISUP protocol would take the form of an initial address message (IAM), while a call tear-down message in the SS7 ISUP protocol would take the form of a release message (REL) or a release complete message (RLC). Conversely, in the packet network 106 using MGCP, a call setup message would take the form of a create connection (CRCX) message while a call tear-down message would take the form of a delete connection (DLCX) message. Further, while described using call setup and call tear-down messages, other signaling messages (that typically occur between the setup and tear-down messages) in both the SS7 and MGCP protocols will traverse the dissimilar communication networks.

In the packet network 106, communication endpoints, such as the telephone 118 are characterized by their "endpoint name," which typically takes the form "user identifier@domain.xxx," while in the PSTN 112, a call is identified by a point code (PC) that relates to its origination point code (OPC), destination point code (DPC) and the circuit, identified by its circuit identification code (CIC), on which it is carried. Therefore, because the signaling used in a single phone call between telephone 118 and telephone 124 is characterized by at least two separate communication protocols (SS7 ISUP on the PSTN side and MGCP on the packet side), it is difficult to provide real-time correlation for the single call and an end to end call record, commonly referred to as a call flow record (CFR) of the single call because of the two different communication protocols used to signal the call.

An analysis device 200 is coupled to the packet network 106 via connection 134 and is coupled to the PSTN 112 via connection 138. In accordance with an embodiment of the invention, the analysis device 200 is coupled to the softswitch 164 via connection 172. The softswitch 164 may include, for example, a model GSX9000 open services switch, provided by Sonus Networks, Inc. of Westford, Mass. The connection 172 can be, for example, an internal bus data connection, or an external data connection. The connection 172 illustrates a connection over which correlation key data (to be described below) is obtained by the analysis device 200. As will be described in greater detail below, the analysis device 200 includes a software code segment that allows the analysis device 200 to correlate dissimilar communication signaling protocols for a single call or for multiple calls using a real time data stream that includes data that can be used to correlate dissimilar protocols associated with multiple segments of the same call, or of multiple calls. In the embodiment to be described below, an MGCP communication endpoint will be correlated to an SS7 ISUP Point Code/Circuit Identification Code (PC/CIC) trunk identifier in a manner such that a single phone call can be completely identified, correlated and optionally displayed in real-time. It should be mentioned that any protocol can be correlated to any other protocol using the concepts of the correlation system to be described below.

Figure 2A:
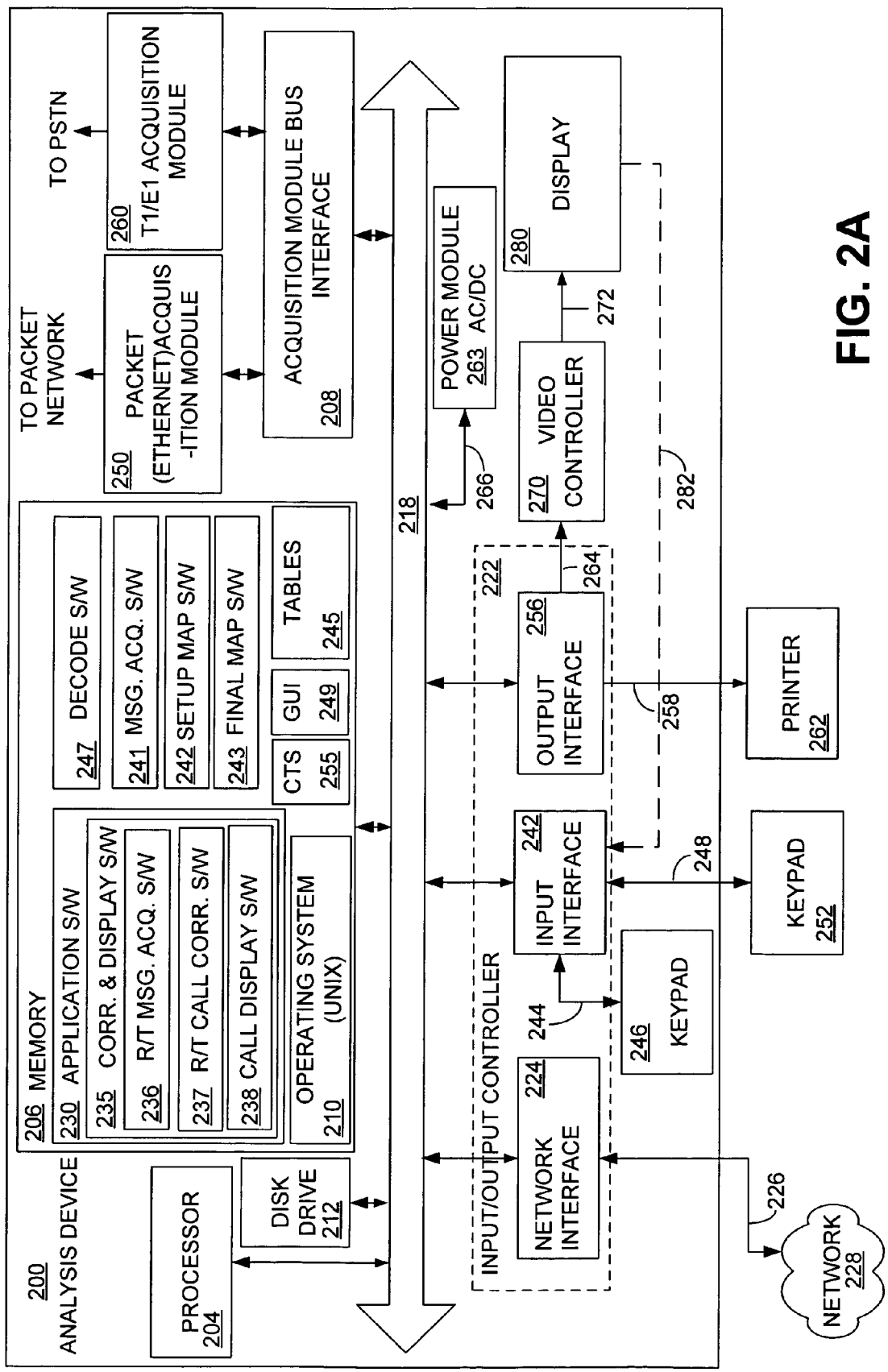
FIG. 2A is a block diagram illustrating an exemplar network analysis device constructed in accordance with an embodiment of the invention.

FIG. 2A is a block diagram illustrating an exemplary network analysis device 200 constructed in accordance with an embodiment of the invention. Generally, in terms of hardware architecture, as shown in FIG. 2A, the analysis device 200 includes a processor 204, memory 206 (one or more random access memory (RAM) elements, read only memory (ROM) elements, etc.), an optional removable media disk drive 212, an acquisition module bus interface 208, referred to below as a "bus interface," an input/output controller 222 and a power module 263 that are connected together and can communicate with each other via a local interface 218. The local interface 218 can be, for example but not limited to, one or more buses or other wired or wireless connections, as is known to those having ordinary skill in the art. The local interface 218 may have additional elements, which are omitted for simplicity, such as buffers (caches), drivers, and controllers, to enable communications. Further, the local interface 218 includes address, control, and data connections to enable appropriate communications among the aforementioned components.

The processor 204 is a hardware device for executing software that can be stored in memory 206. The processor 204 can be any suitable processor for implementing the functionality of the analysis device 200. Preferably, the analysis device 200 executes on a SUN workstation available from SUN Microsystems.

The memory 206 can include any one or a combination of volatile memory elements (e.g., random access memory (RAM, such as DRAM, SRAM, etc.)) and nonvolatile memory elements (e.g., RAM, ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processor 204.

The software in memory 206 may include one or more separate programs, each of which comprise one or more code segments, which are an ordered listing of executable instructions for implementing logical functions. In the example of FIG. 2, the software in the memory 206 includes software in the form of an analysis device application software 230. The application software 230 includes correlation and display software 235, real-time message acquisition software 236, real-time call correlation software 237, call display software 238 and decode software 247. The memory 206 also includes message acquisition software 241, call setup mapping software 242 and final mapping software 243. The memory also includes tables 245, which are used to store the correlation key data (to be described below) that is used to correlate the signaling portions of calls in real time over dissimilar protocols. The memory 206 also includes an active call temporary storage element (CTS) 255, which temporarily stores information relating to active calls that are under analysis.

The memory 206 also includes a graphical user interface (GUI) 249. The GUI 249 processes display information from the call display software 238 for output to a user on the display 280.

The memory 206 also includes one or more operating software modules, collectively referred to as operating system (O/S) 210. The O/S 210 may include software modules that perform some of the functionality of the test device 200 not specifically described herein.

In a preferred embodiment, the O/S 210 is the commonly available UNIX operating system available from SUN Microsystems. However, other operating systems may be used. The operating system 210 essentially controls the execution of other computer programs, such as the analysis device application software 230, correlation and display software 235, and the real time call correlation software 237, and provides scheduling, input-output control, file and data management, memory management, and communication control and related services. The processor 204 and operating system 210 define a computer platform, for which application programs, such as the analysis device application software 230, correlation and display software 235, and the real-time call correlation software 237, are written in higher level programming languages. The correlation and display software 235 and the real-time call correlation software 237 include the executable instructions that allow the analysis device 200 to detect, decode, map, correlate and, optionally, display in real-time correlation key data that allows the analysis device 200 to correlate and display dissimilar communication protocol signaling messages that correspond to related user traffic.

The input/output controller 222 includes a network interface 224, an input interface 242 and an output interface 256 each in communication with the local interface 218. The network interface 224 couples the analysis device 200 to an external network 228 via connection 226. The external network can be any network to which the analysis device 200 may couple to exchange information. The input interface 242 is coupled to an internal keypad 246 via connection 244 and to an external keypad 252 via connection 248. The internal keypad 246 is located on the analysis device 200 while the external keypad 252 is an auxiliary keypad to which the test device 200 may be coupled.

The output interface 256 is coupled to a printer 262 via connection 258. The printer 262 can be used to provide a permanent record of the analysis results obtained by the analysis device 200. The output interface 256 also couples to a video controller 270 via connection 264. The video controller 270 couples to a display 280 via connection 272. The display 280 can be an LCD touch screen display capable of receiving input from a user, but may be any type of suitable display.

The disk drive 212 can be any storage element or memory device, and as used herein, generally refers to flash memory, sometimes referred to as compact flash (CF) or PC card.

The power module 263 can power the analysis device 200 from an AC power source, or can include batteries and a built in charger to provide portable DC power.

The bus interface 208 provides both electrical and mechanical interfaces to a packet acquisition module 250 and a T1/E1 acquisition module 260. In accordance with an aspect of the invention, the packet acquisition module 250 couples to the packet network 106 (FIG. 1) and receives correlation key data from, for example, the softswitch 164 (FIG. 1) or from a media gateway 104 (FIG. 1). The packet acquisition module 250 monitors the packet network signaling traffic, receives the correlation key data, and forwards the correlation key data to the real time message acquisition software 236. The correlation key data is stored in the tables 245 and may take the form of, for example, a data stream including call identification (call ID) information and, in the case of SS7 signaling messages, PC/CIC information. For example, the correlation key data may appear as S5/DS1-0/7TGR00atl.agilent.com/222-333-444+1027, where "S5/DS1-0/7TGR00atl.agilent.com" is the Endpoint name for an MGCP signal message, and "222-333-444+1027" is the PC/CIC for an SS7 signaling message. Examples of data elements that may be used for correlation include, but are not limited to, real-time transport protocol (RTP), IP addresses, asynchronous transfer mode (ATM) virtual connection identifiers, phone numbers, call identifiers, etc. The real-time call correlation software 237 and the decode software 247 detects, decodes and stores the correlation key data received by the packet acquisition module 250.

Once the correlation key data is stored in one or more tables 245, the real-time call correlation software 237 correlates the call portions identified by the correlation key data. In this manner, a call record can be developed that defines both the packet network and PSTN signaling aspects of the call. The correlation and display software 235 detects in real-time all packet network signaling messages (in this example, MGCP messages) and PSTN network signaling messages (in this example, SS7 messages), and correlates these messages into a call flow record pertaining to a single call. In other words, all signaling messages, regardless of whether they are packet network signaling messages or PSTN network signaling messages that correspond to a particular call, or to a group of related calls (for example, in the case of a conference call) are displayed to a user. In this manner, a user of the analysis device 200 can monitor, in real-time, all messages that correspond to each call traversing the dissimilar communication networks.

When the analysis device 200 is in operation, the processor 204 is configured to execute software stored within the memory 206, to communicate data to and from the memory 206 and to generally control operations of the analysis device 200 pursuant to the software. The correlation and display software 235 is read by the processor 204, perhaps buffered within the processor 204, and then executed.

When portions of the network analysis system 200 are implemented in software, as is shown in FIG. 2A, it should be noted that the O/S 210, analysis device application software 230 and the correlation and display software 235 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The O/S 210, analysis device application software 230 and the correlation and display software 235, which in this embodiment includes the real-time message acquisition software 236, real-time call correlation software 237 and the call display software 238, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The hardware components of the network analysis system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2B:
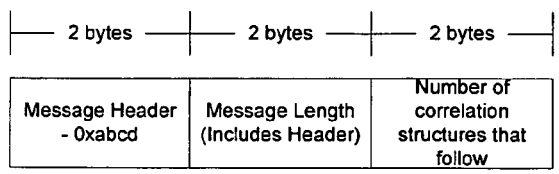
FIG. 2B is a block diagram illustrating an exemplary correlation data structure.
Figure 2B:
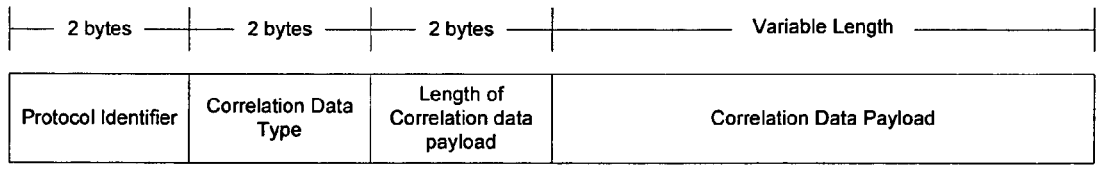

FIG. 2B is a block diagram illustrating an exemplary correlation data structure 290.

Figure 3:
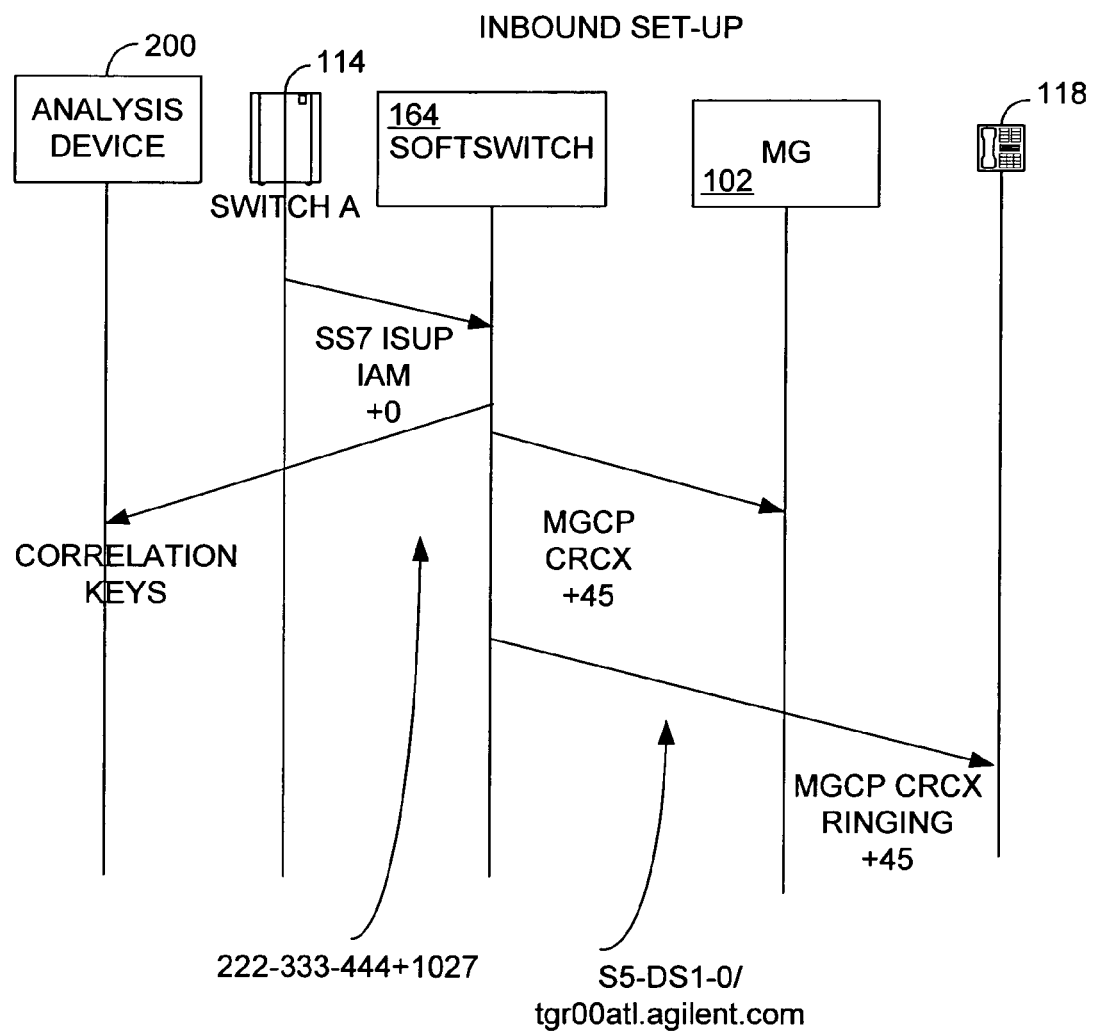
FIGS. 3 and 4 are call flow diagrams illustrating the signaling messages used to setup an inbound call and an outbound call and including the correlation key data, respectively.
Figure 4:
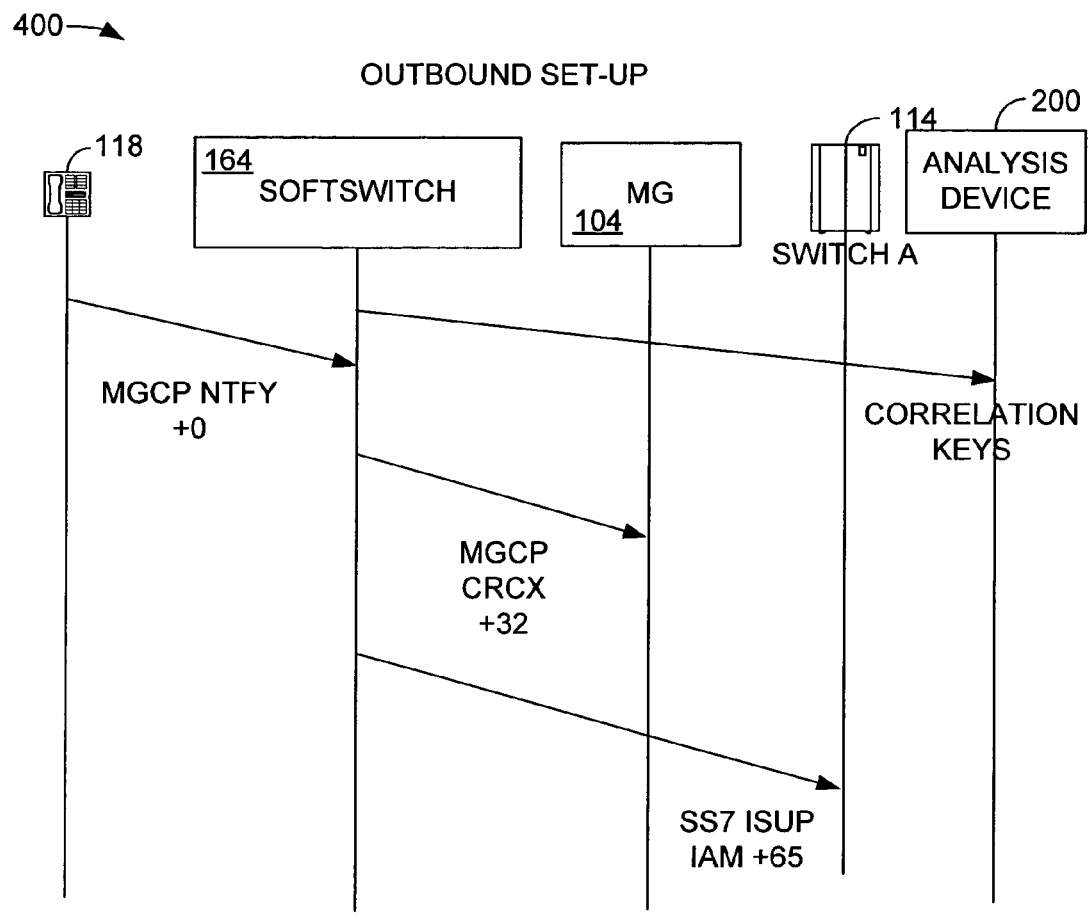

FIGS. 3 and 4 are call flow diagrams 300 and 400 illustrating the signaling messages used to setup an inbound call and an outbound call and including the correlation key data, respectively. A brief overview of the SS7 and MGCP call setup and call tear-down messages will be provided. Further, while the real-time call correlation software 237 operates on all signaling messages that traverse the dissimilar communication networks shown in FIG. 1, for simplicity only call setup and call tear-down messages will be discussed in detail.

The real-time call correlation software 237 stores call setup signal messages and call tear-down signal messages and uses the correlation key data to map an SS7 PC/CIC to a packet network (e.g., IP) endpoint name. As shown in FIGS. 3 and 4, the correlation key data is supplied to the analysis device 200 along with the signaling messages. The real-time call correlation software 237 detects correlation key data, SS7 ISUP messages and MGCP (IP) messages and uses the information in the correlation key and the protocol messages to correlate, in this example, MGCP and SS7 messages into a single call flow record. After the call flow record is created it may be presented to a user on a user interface. Optionally, call flow record metrics could be sent to a billing or operations support system (OSS), which enables telecommunications companies to manage, monitor and control their telecommunications networks. Further, while complete decodes of messages are illustrated below, the decode software 247 may only partially decode the messages below to extract the desired information.

Call Setup Messages

In the SS7 signaling system the call setup message is the SS7 ISUP IAM and in MGCP the call setup message is the MGCP CRCX.

The decode software 247 decodes the SS7 ISUP IAM message to extract the relevant OPC, DPC and CIC information. The following is an exemplary IAM message decode. Shown below is a full decode of the SS7 ISUP IAM message. However, because the correlation and display software 235 uses only the OPC, DPC and CIC information (for this example), the decode software 247 may only partially decode the message to yield the desired terms.

```
BEGIN DECODE --------------------------------------------
BSN: 100 BIB:1 FSN:29 FIB:1 LI:54
Si/Ssf: 05/08 Dpc: 153-028-030 Opc: 146-193-014 Sls: 24
CIC: 131
MT: 01
Nature of Connection Indicators
    Satellite Indicator: No satellite circuit in the
connection
    Continuity Check Indicator: Not required
    Echo control Device Indicator: Outgoing half echo device
not included
```

-continued

Forward Call Indicators
    Incoming International Call Indicator: Not an incoming international call
    End to End Method Indicator: No end-to-end method available
    Interworking Indicator: No interworking encountered
    IAM Segmentation Indicator: No indication
    ISDN User Part Indicator: ISUP used all the way
    ISDN User Part Preference Indicator: ISUP preferred all the way
    ISDN Access Indicator: Originating access non-ISDN
    SCCP Method Indicator: No indication
    Translated Called Numb Indicator: number translated
    QoR Attempt Indicator: no QoR routing attempt in prog
    Reserved for national use: 0
Calling Party's Category: Ordinary calling subscriber
Pointer to User Service Information: 3 octets
Pointer to Called Party Number: 6 octets
Pointer to Optional Part: 13 octets
User Service Information Length: 3 octets
    Info transfer Capability: Speech
    Coding Standard: CCITT standardized
    Information Transfer rate: 64 kbit/s
    Transfer Mode: Circuit mode
    Extension Indicator: No extension
    User Info Layer 1 Protocol: Recommendation G.711 u-law speech
Called Party Number Length: 7 octets
    Nature of Address Indicator: National (significant) number
    Odd/Even Indicator: Even num of address signals
    Numbering Plan Indicator: ISDN/Telephony
    Address Signal: 9093910010
Calling Party Number Id
    Length: 7 octets
    Nature of Address Indicator: Unique national number
    Odd/Even Indicator: Even num of address signals
    Screening Indicator: Network provided
    Presentation Restriction Indicator: Presentation allowed
    Numbering Plan Indicator: ISDN/Telephony
    Address Signal: 2022372470
Charge Number Id
    Length: 7 octets
    Nature of Address Indicator: ANI of the Calling party; national number
    Odd/Even Indicator: Even num of address signals
    Numbering Plan Indicator: ISDN/Telephony
    Address Signal: 9022372470

-continued

Jurisdiction Information Id
    Length: 3 octets
    Address Signal: 202237
Timestamp: 17:07:30.65480762 GMT
END DECODE -------------------------------------------------

Within the SS7 ISUP IAM message, and any SS7 message, in this example, three fields are significant. These are the originating point code (OPC), the destination point code (DPC), and the circuit identification code (CIC). These fields are indicated above in bold. The OPC (146-193-014) is the PC of the SS7 network entity that originated the call. The DPC (153-028-030) is the PC of the SS7 network entity that is the call destination. The CIC (131) is used to identify the specific trunk circuit between the SS7 switches.

The real-time call correlation software 237 identifies the call identified by this SS7 ISUP LAM message by appending the CIC to the PC that is not equal to the PC of the softswitch. Consider the decode above, if the softswitch PC is 153-28-30 (equal to DPC), then the real-time call correlation software 237 will identify this SS7 ISUP IAM by the PC/CIC 146-193-14+131 (OPC+CIC). As will be described in detail below, the real-time call correlation software 237 will utilize the correlation key data to ultimately map the PC/CIC (146-193-14+131) to a packet network endpoint name and generate a call flow record. Ultimately the call flow record will be presented to a consumer of call data from the analysis device 200.

The decode software 247, decodes the MGCP CRCX message to extract the relevant endpoint and call identification information. The following is an exemplary decode of an MGCP CRCX message. For a given SS7 ISUP IAM message the real-time call correlation software 237 will map MGCP call legs to corresponding call legs as specified by the correlation key data.

Shown below is a full decode of the MGCP CRCX message. However, because the real-time call correlation software 237 uses only a subset of message data elements the decode software 247 may only partially decode the message to yield the desired data elements.

```
BEGIN DECODE -----------------------------------------
MGCP
    Command [CRCX]         : Create Connection
    Transaction ID         = 12104586
    Endpoint               = S4/DSl-1/1@TGR02COS.cos0.company.net
    Version                = MGCP 0.1
Parameters:
    Notified Entity                      [N] : mgcp.aSCT1CA.cos0.company.net:2427
    Call ID                              [C] : 66d3
    Local Options                        [L] :
        p: Packetization Period                      = 20,
        a: Compression Alg.                          = PCMU
                                                       PCMA
        e: Echo Cancellation                         = on,
        s: Silence Suppression                       = off,
        t: Service Type                              = a0,
        nt: Network Type                             = IN
    Connection Mode                      [M] : sendrecv - - Gateway should
send and receive packets.
SDP Information - - Audio Service:
    Version                              [v] : 0
    Origin Identifiers                   [o] :
        Username                             = –
        Session ID                           = 2708
```

-continued

```
        Session Version           = 0
        Network Type              = IN
        Address Type              = IP4
        Address                   = 64.213.155.8
    Session Name                  [s] : Cisco SDP 0
    Connection Data               [c] :
        Network Type     = IN
        Address Type     = IP4
        Connection       = 64.213.155.8
    Times                         [t] : Start = 0 Stop = 0
    Media Description             [m] :
        Media Type       = audio
        Port             = 16388
        Transport Prot   = RTP/AVP
        Format(s)        = 0 - - G.711: Mu-law pulse code
mod (PCMU), 1 chan audio (8 KHz)
                           8 - - G.711: A-law Pulse code mod.
(PCMA) 1 chan audio (8 KHz)
END DECODE ----------------------------------------------
```

In this example, two fields of interest within the MGCP CRCX message are the call ID field and the endpoint name field, both illustrated above in bold. The call ID field (66d3 in the decode above) is unique to a single call and can be used to match the MGCP CRCX call setup message with the MGCP DLCX call tear-down message (to be described below). The endpoint name field, (in this example S4/DS1-1/1@TGR02COS.cos0.company.net) identifies the endpoint to which the call is directed and also identifies the type of endpoint. This endpoint name (in this example S4/DS1-1/1@TGR02COS.cos0.company.net) will be mapped to a PC/CIC using the correlation key data information supplied from the softswitch 164. The real-time call correlation software 237 will use this mapping information to correlate the SS7 and MGCP messages to a single call, and present a call flow record, or a subset of information regarding this call, to a user of the system.

Figure 5A:
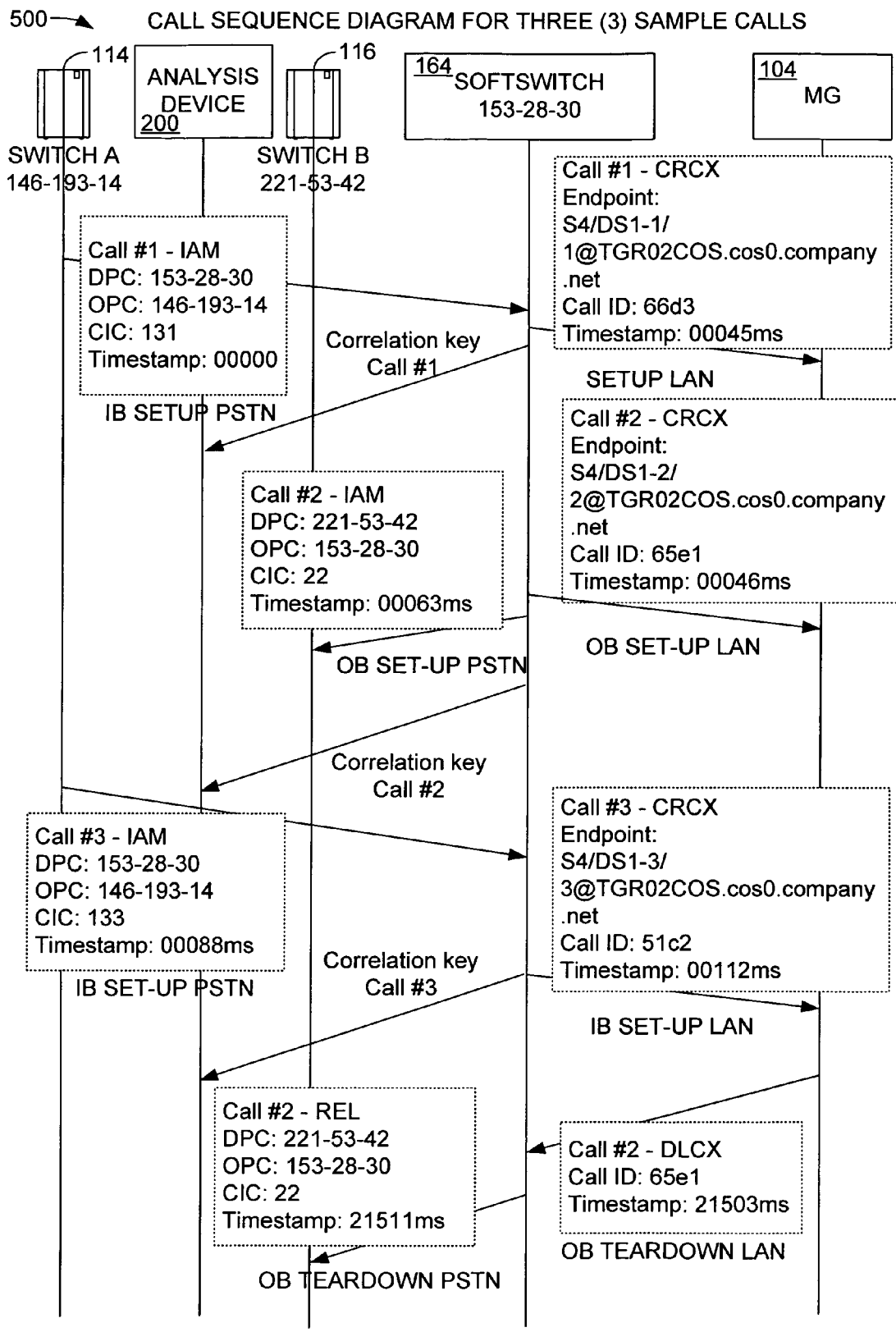
FIGS. 5A and 5B collectively illustrate a call sequence diagram of three calls that will be used to illustrate the operation of certain embodiments of the invention.
Figure 5B:
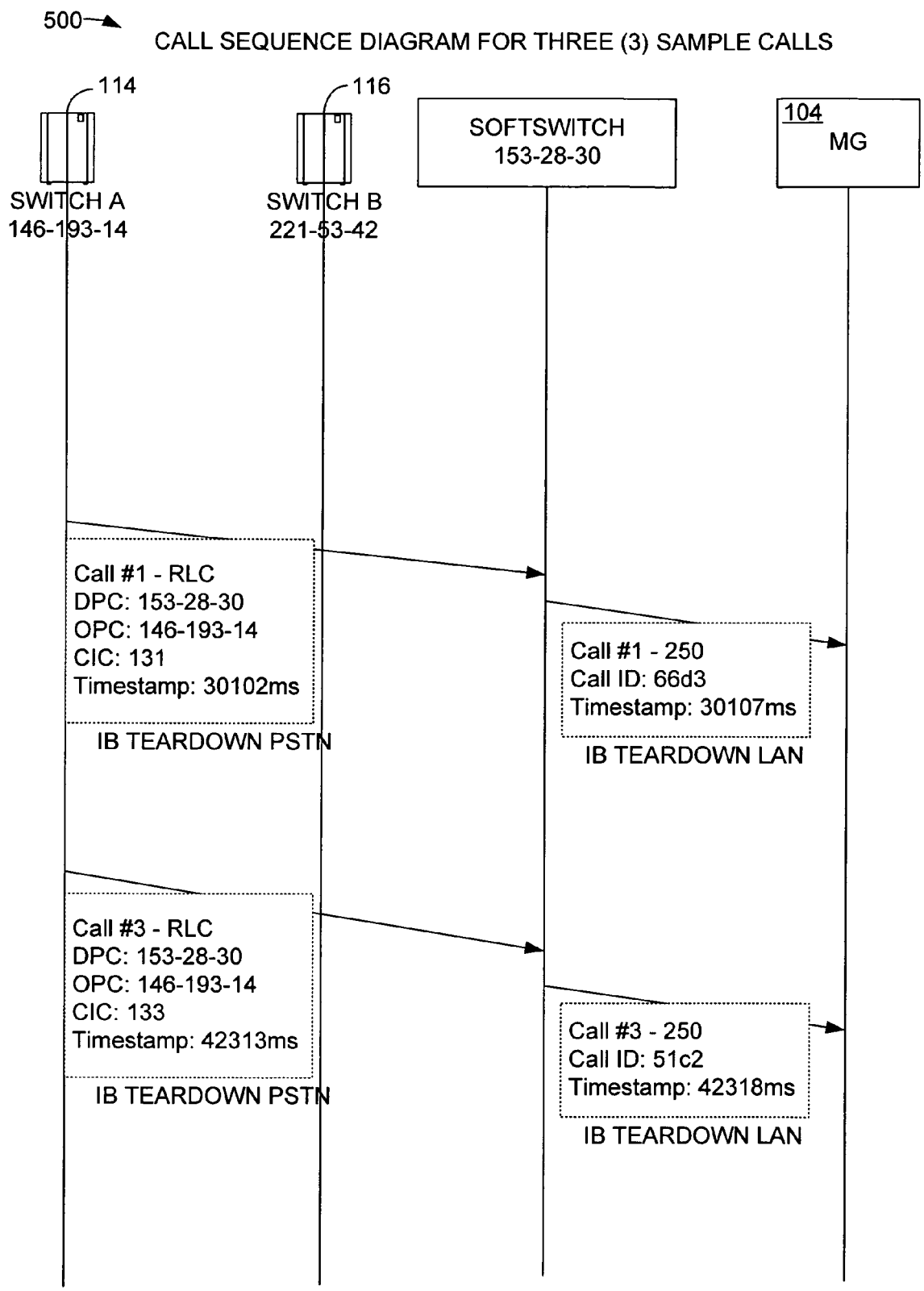

FIGS. 5A and 5B collectively illustrate a call sequence diagram 500 of three exemplary calls that will be used to illustrate the operation of certain embodiments of the invention. Although only call setup and call tear-down messages are illustrated, it should be mentioned that many signaling messages will occur between the call setup and call tear-down messages for each call and the real-time call correlation software 237 will act on these messages as well. The message acquisition software 241 detects, and the decode software 247 decodes all correlation key data, call setup (SS7 ISUP LAM and MGCP CRCX) and call tear-down messages (SS7 ISUP REL/RLC and MGCP DLCX). The real-time message acquisition software 236 detects, and the decode software 247 decodes, all SS7 and MGCP messages.

The following describes the operation of the real-time call correlation software 237.

Operation of the Real-time Call Correlation Software 237

The following discussion describes the call setup messages found in FIG. 5A and FIG. 5B. Tables 1 and 2 illustrate the protocol messages that are used to construct the correlation key data having the call correlation key values shown in Table 3. The correlation key data is used to match MGCP to SS7 call legs as described above. Following is a discussion of the process when call setup and call correlation messages are received by the analysis device 200.

TABLE 1

SS7 ISUP IAM Message List

SS7 ISUP IAM Call #1
DPC: 153-28-30
OPC: 146-193-14
CIC: 131
Timestamp: 00000 ms
SS7 ISUP IAM Call #2
DPC: 221-53-42
OPC: 153-28-30
CIC: 22
Timestamp: 00063 ms
SS7 ISUP IAM Call #3
DPC: 153-28-30
OPC: 146-193-14
CIC: 133
Timestamp: 00088 ms

TABLE 2

MGCP CRCX Message List

MGCP CRCX Call #1
Endpoint: S4/DS1-1/1@TGR02COS.cos0.company.net
Call ID: 66d3
Timestamp: 00045 ms
MGCP CRCX Call #2
Endpoint: S4/DS1-2/2@TGR02COS.cos0.company.net
Call ID: 65e1
Timestamp: 00046 ms
MGCP CRCX Call #3
Endpoint: S4/DS1-3/3@TGR02COS.cos0.company.net
Call ID: 51c2
Timestamp: 00112 ms
. . .

TABLE 3

Correlation Key Data

Correlation Key Call #1
correlation structs: 2
Protocol Id: SS7
Correlation Type: PC + CIC
Payload: 153 – 28 – 30 + 131
Protocol Id: MGCP TABLE 3-continued Correlation Key Data Correlation Type: Endpoint Name
Payload: S4/DS1-1/1@TGR02COS.cos0.company.net
Correlation Key Call #2
correlation structs: 2
Protocol Id: SS7
Correlation Type: PC + CIC
Payload: 221 – 53 – 42 + 22
Protocol Id: MGCP
Correlation Type: Endpoint Name
Payload: S4/DS1-2/2@TGR02COS.cos0.company.net
Correlation Key Call #3
correlation structs: 2
Protocol Id: SS7
Correlation Type: PC + CIC
Payload: 146 – 193 – 14 + 133
Protocol Id: MGCP
Correlation Type: Endpoint Name
Payload: : S4/DS1-3/3@TGR02COS.cos0.company.net The call sequence diagram in FIG. 5A includes an IAM for PC-CIC 146-193-14+131. This message is read into analysis device 200 through the T1/E1 acquisition module 260 (FIG. 2). The message is then passed to the real-time message acquisition software 236 and the message is decoded into fields used for call correlation by the decode software 247. In this example the PC+CIC is extracted and decoded. The decoded data element that contains the PC+CIC is referred to as the "Endpoint").

Next, the decoded information is passed to the real-time call correlation software 237. This module inspects an internal hash table, referred to as the "call leg table," which is shown in Table 4, and which contains call leg portions, after the call portions are added to the call leg table. The call leg table contains all Endpoints that are currently involved with a call.

TABLE 4

Call Leg Table Entry Example 1

| 146 – 193 – 14 + 131 | 900 | IAM |
| | | REL |
| | | RLC |

The call leg table lookup will initially fail due to endpoint 146-193-14+131 not being in the call leg table at the time of initial lookup. The real-time call correlation software 237 creates a call leg entry in its call leg table with an Endpoint key value of 146-193-14+131, as shown in Table 4. This call leg entries' status field is set to active.

Next, the correlation key table (Table 3) is checked. The correlation key table (Table 3) is queried to determine whether there is an entry for the Endpoint currently under analysis (uniquely identified as Endpoint 146-193-14+131). This table lookup fails and a new, unique, call ID is generated by the real-time call correlation software 237. For this example, the call ID is 900 as shown in Table 4. The newly generated call ID is now associated with call leg 146-193-14+131 in the call leg table (Table 4).

Since this is a new call, an entry is added to the call table. The call table is illustrated below as Table 5. This call table entry has a call id value of 900 and the call table entry has one pointer to call leg 146-193-14+131.

TABLE 5

Call table Example

| 900 | pointer to call leg 146 – 193 – 14 + 131 | inactive |
| | pointer to call leg S4/DS1-1/1@TGR02COS.cos0.company.net | active |

Next, the raw protocol message (the IAM) is added to the call leg's data store. As subsequent messages for this call leg enter the system they will also be added to this data store.

The next message shown on the call sequence of FIG. 5A is an MGCP CRCX message for endpoint S4/DS1-1/1@TGR02COS.cos0.company.net. This message is read into analysis device 200 through the packet acquisition module 250 (FIG. 2). This message is transferred to the real-time message acquisition software 236 and the message is decoded into key fields used for call correlation by the decode software 247. In this example, the Endpoint and call ID are extracted and decoded.

Next, decode information is passed to the real-time call correlation software 237, which performs a table lookup into the call leg table (Table 6) for endpoint value S4/DS1-1/1@TGR02COS.cos0.company.net.

TABLE 6

Call Leg Table Entry Example 2

| S4/DS1-1/1@TGR02COS.cos0.company.net | 900 | CRCX |
| | | DLCX |
| | | 250 |

The call leg table lookup will fail due to endpoint not currently being in the table. At this time the real time call correlation software 237 creates a call leg entry in its call leg table with an endpoint key value of S4/DS1-1/1@TGR02COS.cos0.company.net. This call leg entries' status field is set to active.

Next, a check is made against the correlation key table (Table 3). The correlation key table is queried to determine whether an entry for the endpoint S4/DS1-1/1@TGR02COS.cos0.company.net exists. This table lookup fails and a new, unique, call ID is generated by the real-time call correlation software 237. For this example the call ID is 1100. The newly generated call ID is now associated with call leg S4/DS1-1/1@TGR02COS.cos0.company.net in the call leg table (Tables 4 and 6).

Since it is determined that this is a new call, an entry is added to the call table (Table 5). This call table entry has a call ID value of 1100 and the call table's entry has one pointer to call leg S4/DS1-1/1@TGR02COS.cos0.company.net.

Next, the raw protocol message (the CRCX) is added to the call leg's data store. As subsequent messages for this call leg enter the system they will also be added to this data store.

The next message shown in FIG. 5A is a correlation key. This message enters the analysis device 200. The message is read by the packet acquisition module 250 and transferred to the real-time message acquisition software 236. The correlation key message is then forwarded to the real-time call correlation software 237.

The correlation message specifies that Endpoint names 146-193-14+131 and S4/DS1-1/

1@TGR02COS.cos0.company.net are to be associated in a call. A correlation key example is shown in Table 7.

TABLE 7

Correlation key examples

| | |
|---|---|
| 146 – 193 – 14 + 131 | S4/DS1-1/<br>1@TGR02COS.cos0.company.net |
| S4/DS1-1/<br>1@TGR02COS.cos0.company.net | 146 – 193 – 14 + 131 |

The real-time call correlation software 237 attempts to read its correlation key table (Table 3) for an entry having a value of 146-193-14+131. The value is not found in the correlation key table (Table 3) and thus this value is added. The corresponding endpoint (S4/DS1-1/1@TGR02COS.cos0.company.net) is associated with the newly created correlation key as shown in Table 7.

Next, the other endpoint from the correlation data in the correlation message is processed. The real-time call correlation software 237 reads the correlation key table (Table 3) and attempts to find an entry with a value of S4/DS1-1/1@ (TGR02COS.cos0.company.net. The value is not found and thus the value S4/DS1-1/1@TGR02COS.cos0.company.net is added to the correlation key table (Table 3). The corresponding correlation key endpoint (146-193-14+131) is associated with the correlation key just added as shown in Table 7.

Next the real time call correlation software 237 determines whether a call leg for either of the endpoints in the correlation key exists in the call leg table (Table 4 or 6). Endpoint 146-193-14+131, which is associated with call 900, is found in the call leg table (Table 4). Next the endpoint name S4/DS1-1/1@(TGR02COS.cos0.company.net is queried in the call leg table (Table 6). This endpoint name is found and a call merge is performed.

The call merge action adds additional call leg(s) into an existing call. In this example, call leg S4/DS1-1/1@TGR02COS.cos0.company.net (which has been tagged with call ID 1100) will be added to call 900. When the call merge is complete, call 1100 will be deleted from the call table (Table 5). The result of the call merge is that the call legs mentioned in this example are now assigned to one single call, as shown in Table 5.

Referring to FIG. 5B, the RLC (release complete) message for endpoint 146-193-14+131 is received. This message flows through the system as described above and arrives at the real-time call correlation software 237 as described above. The RLC message is added to the data store of protocol messages related to call leg 146-193-14+131. Next, the real-time call correlation software 237 interprets the RLC message as an indication that call leg 146-193-14+131 is being removed from a call. At this time, the call tear down logic is executed.

The call tear down logic for an individual call leg comprises "cleaning up" tables for entries relating to the call leg. When all call legs for one call have a status of "inactive" the call is over and the call table entry is removed from system memory. When call tear down for Endpoint 146-193-14+131 is invoked, the call leg entry in the call table (Table 5) is set to inactive. The correlation key relating to endpoint 146-193-14+131 is removed from the correlation key table (Table 7).

Next, the 250 message for endpoint S4/DS1-1/1@ (TGR02COS.cos0.company.net is received. This message arrives at the real-time call correlation software 237. The 250 message is added to the data store of protocol messages related to call leg S4/DS1-1/1@TGR02COS.cos0.company.net. The real-time call correlation software 237 interprets the 250 message as an indication that call leg S4/DS1-1/1@TGR02COS.cos0.company.net is being removed from a call. At this time the call leg tear down logic is executed and the endpoint's call leg entry in the call table (Table 5) is set to inactive and the correlation key relating to endpoint S4/DS1-1/1@TGR02COS.cos0.company.net is removed from the correlation key table (Table 7). Since all call legs for call 900 are now inactive the call entry can be removed from the call table (Table 5). This call is complete.

Figure 6A:
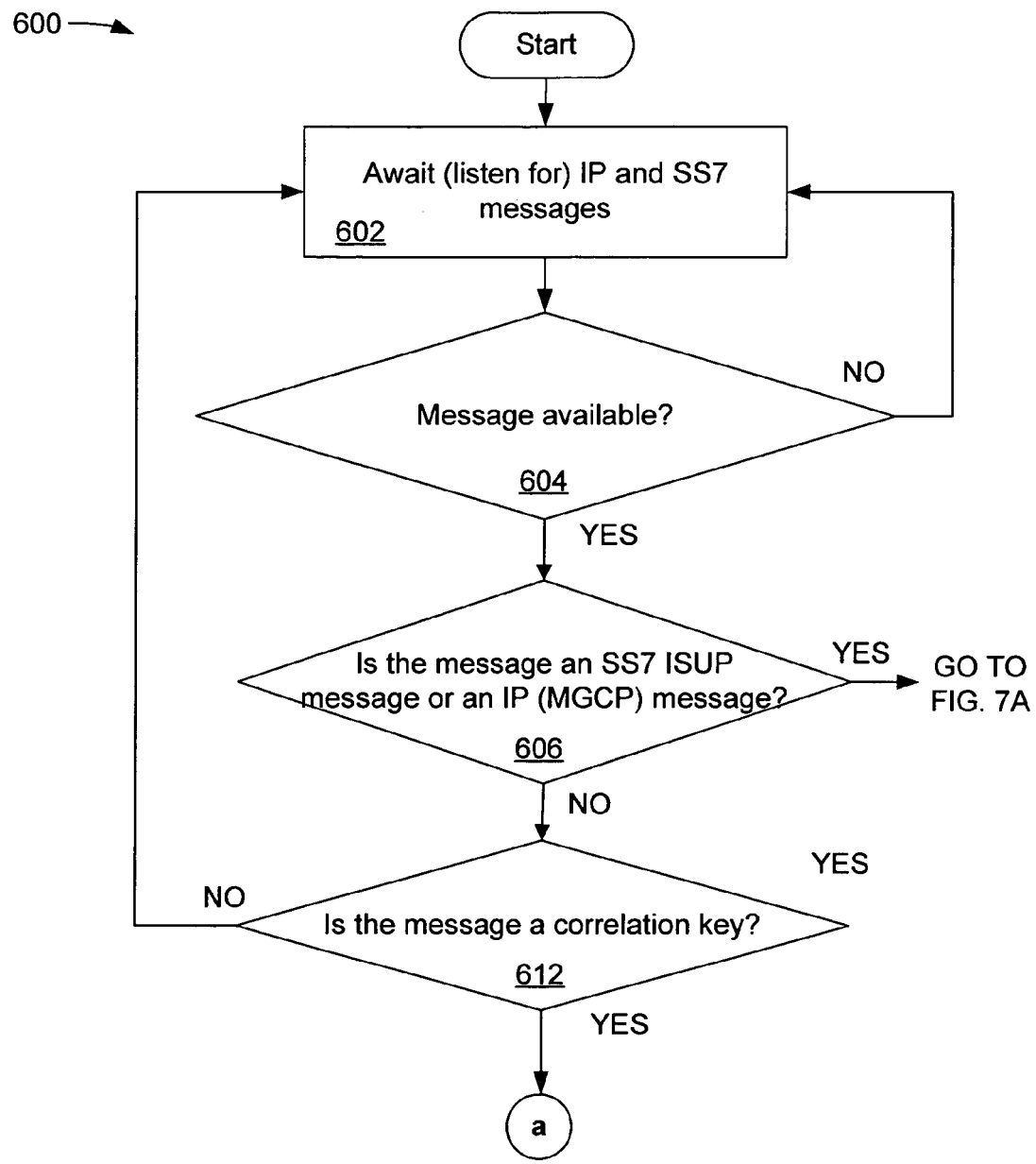
FIGS. 6A through 6C comprise a flowchart collectively illustrating the operation of an embodiment of the system for correlating dissimilar communication signaling protocols.
Figure 6B:
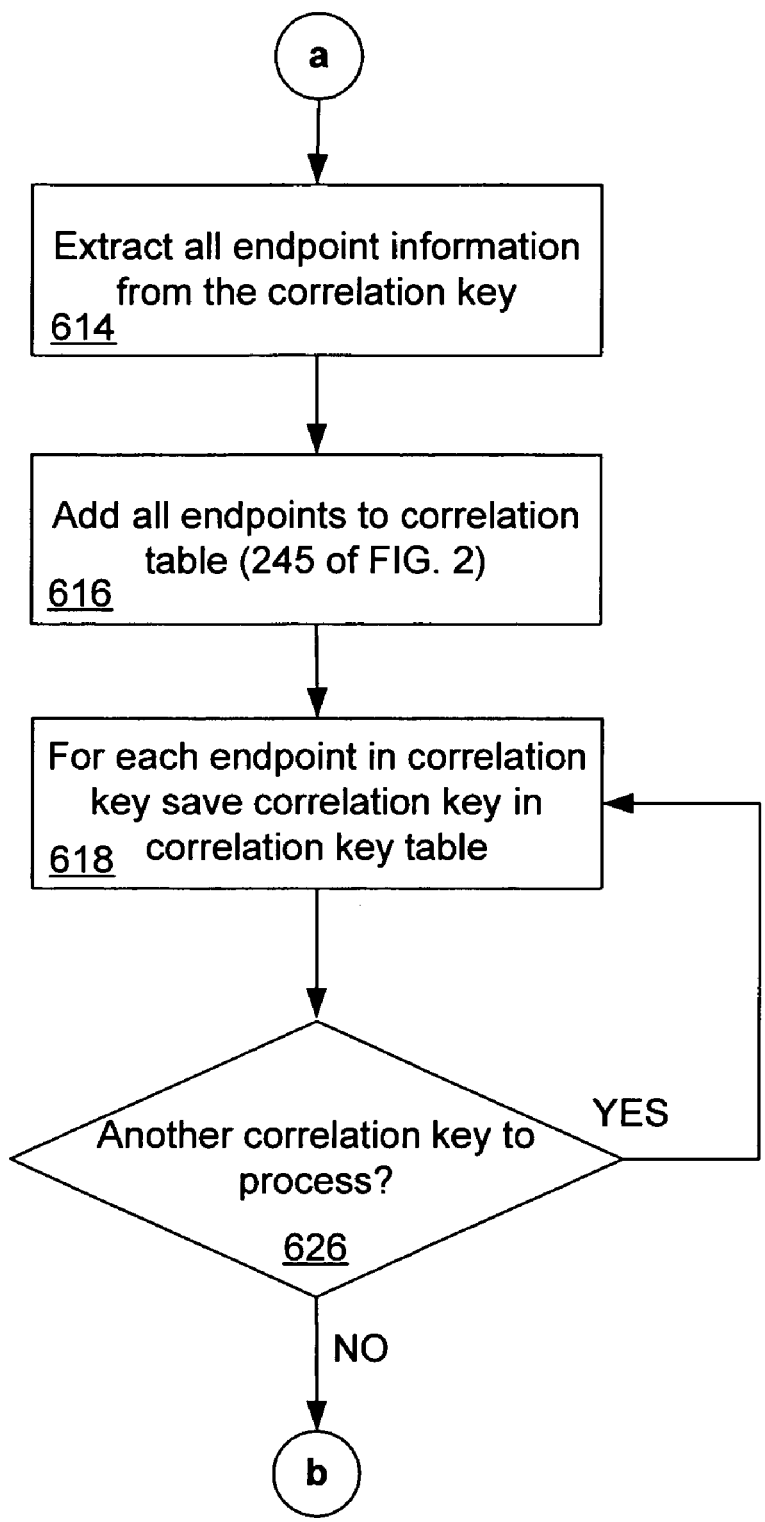
Figure 6C:
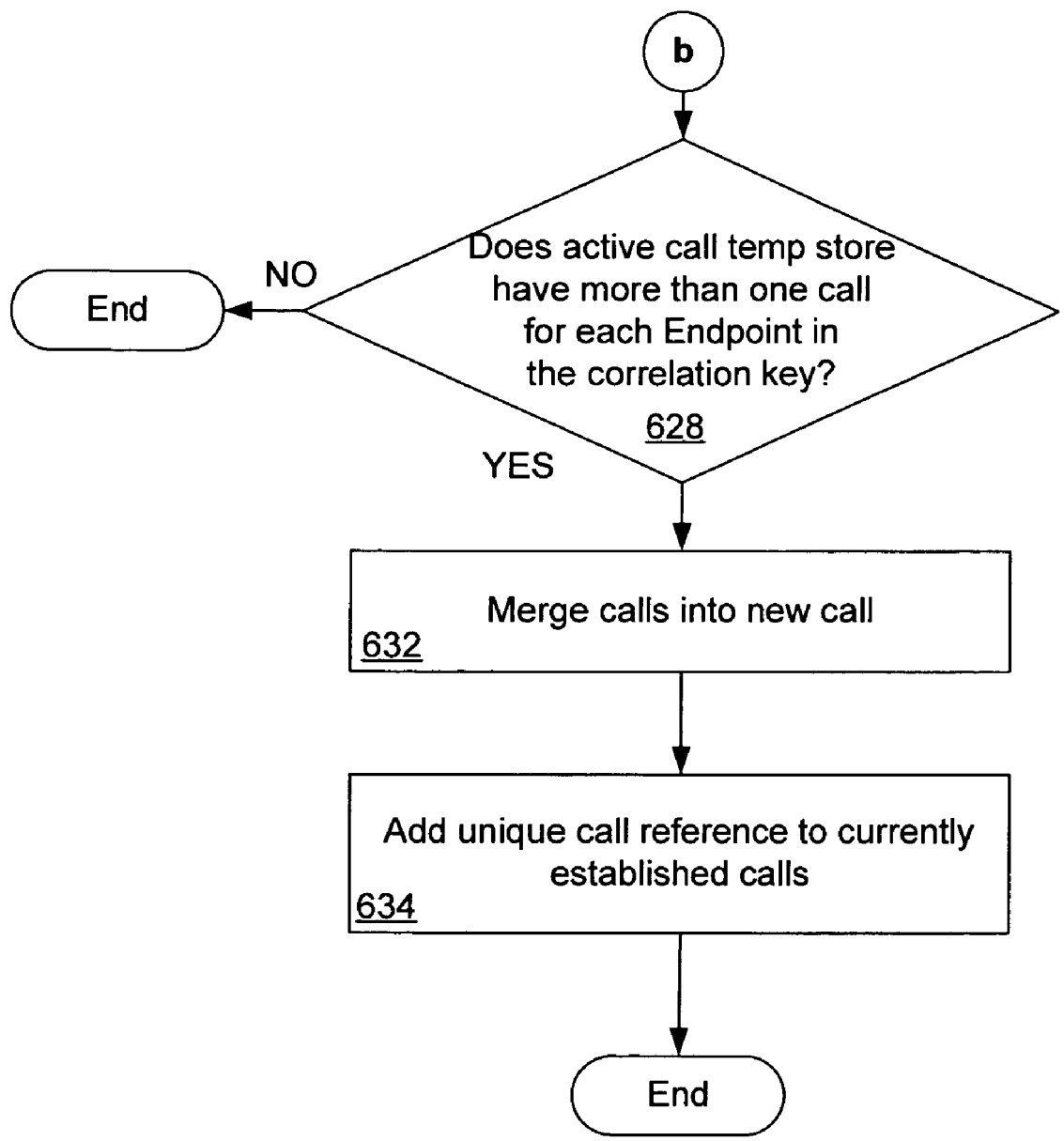

FIGS. 6A through 6C comprise a flowchart 600 collectively illustrating the operation of an embodiment of the system for correlating dissimilar communication signaling protocols.

In block 602, the analysis device 200 (FIG. 2) remains idle and awaits IP or SS7 protocol messages. In block 604 it is determined whether a message is available. If there is no message available, then the process returns to block 602. If a message is available, then, in block 606, it is determined whether the message is an SS7 ISUP message or an MGCP message. If the message is an SS7 ISUP message or an MGCP message, then the process proceeds to FIG. 7A. If the message is not an SS7 ISUP message or an MGCP message, then the process proceeds to block 612.

In block 612 it is determined whether the message is a correlation key having correlation data information. If the message is not a correlation key, then, the process returns to block 602.

If however, the message is determined in block 612 to be a correlation key, then, in block 614, for example, all communication Endpoint information is extracted from the correlation key. For example, if the packet acquisition module 250 transfers a correlation key to the real time message acquisition software 236, the correlation key data including all Endpoint information identified by the correlation key is placed in the correlation key table 245 (Table 7). Endpoint information is one example of correlation key data. When the correlation key data is placed in the table 245, it is available to the real-time call correlation software 237, which extracts the above mentioned Endpoint information from the correlation key. In this example, both the SS7 ISUP Endpoint information and the IP (MGCP) Endpoint information is extracted from the correlation key.

In block 616 the Endpoints extracted in block 614 are added to the correlation table 245 of FIG. 2 (Table 7).

In block 618, for each Endpoint in the correlation key, the Endpoint and the correlation key are saved in the correlation key table 245.

In block 626 it is determined whether there are any additional correlation keys to process. If yes, then the process returns to block 618. If however, it is determined in block 626 that there are no addition correlation keys to process, then, in block 628 it is determined whether the active call temporary storage element 255 (FIG. 2) includes more than one call for each endpoint in the correlation key. If not, then the process ends. If however, it is determined that the active call temporary storage element 255 includes more than one call, then, in block 632, the multiple calls are merged into a new call as described above. In block 634 a unique call reference is added to the currently established calls.

Figure 7A:
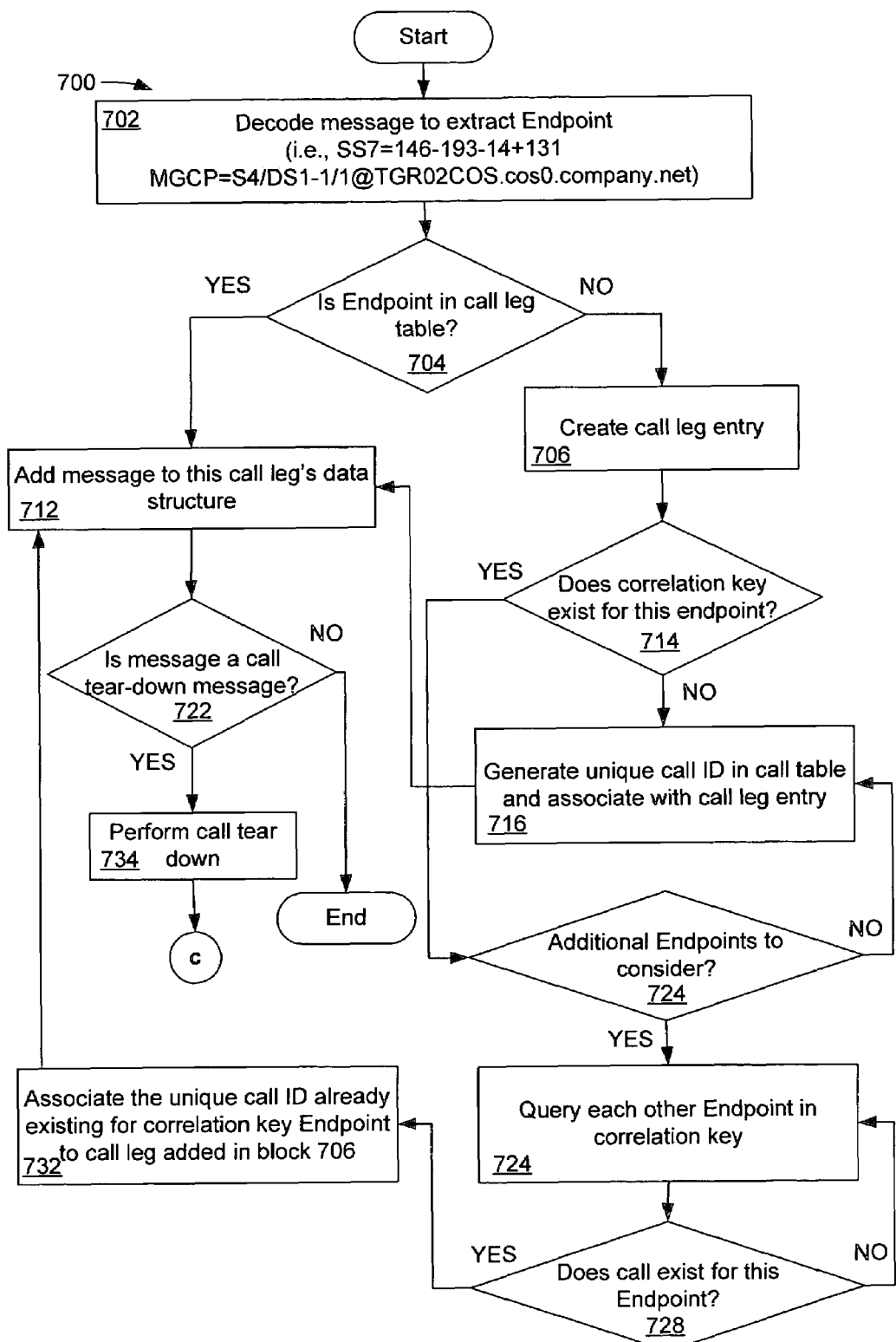
FIGS. 7A and 7B comprise a flowchart collectively illustrating the decoding of an SS7 or an IP message to extract an Endpoint and associate the Endpoint to a correlation key.
Figure 7B:
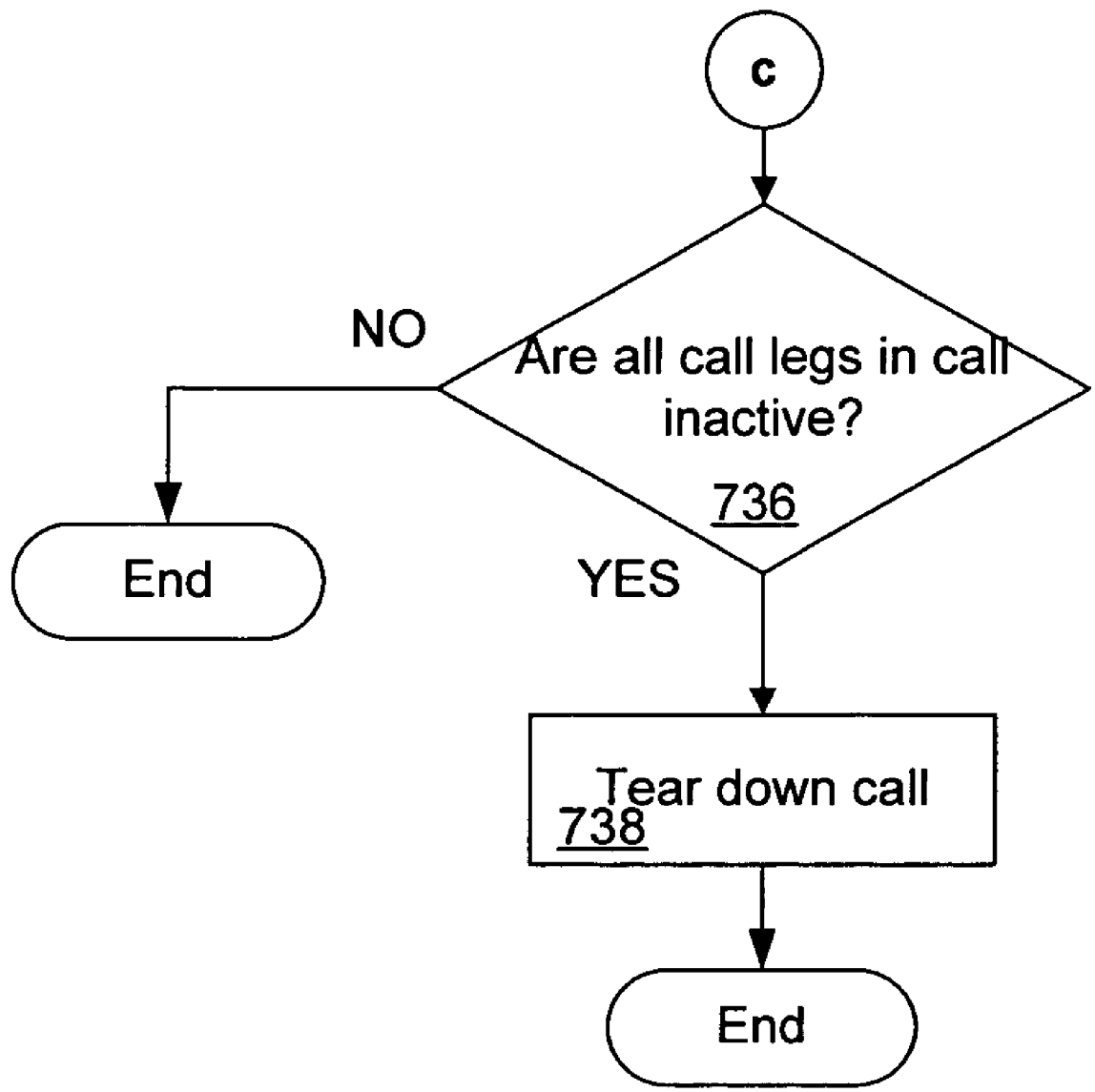

FIGS. 7A and 7B are a flowchart 700 collectively illustrating the decoding of an SS7 or an IP message to extract an Endpoint and associate the Endpoint to a correlation key. In block 702 the message is received from block 606 of FIG. 6A. In block 702 the received message is decoded to extract the Endpoint information. For example, if the message is an SS7 message, the endpoint 146-193-14+131 would be extracted.

If the message is, for example, an MGCP message, then the Endpoint extracted would be S4/DS1-1/1@TGR02COS.cos0.company.net.

In block 704 it is determined whether the Endpoint extracted in block 702 is in the call leg table (Table 4). If the Endpoint is not in the call leg table, then, in block 706 a call leg entry is created in the call leg table. If it was determined in block 704 that the Endpoint was in the call leg table, then, in block 712 this message is added to the call leg's data structure.

In block 714 it is determined whether a correlation key exists for the Endpoint decoded in block 702. If a correlation key does not exist, then, in block 716 a unique call ID is generated in the call leg table and associated with the call leg entry (Table 6). If a correlation key does exist for this endpoint, then, in block 724, it is determined whether there are additional Endpoints to consider. If not, then the process returns to block 716. If, however, there are additional Endpoints to consider, then, in block 724 each other Endpoint in the correlation key is queried.

In block 728 it is determined whether a call exists for any additional Endpoint queried in block 724. If not, then the process returns to block 724. If, however, in block 728 it is determined that a call exists for the additional Endpoint, then, in block 732 the unique call ID already existing for the correlation key endpoint is associated to the call leg that was added in block 706.

In block 712, this message is added to the call leg data structure. In block 722 it is determined whether the message is a called teardown message. If not, then the process ends and returns to FIG. 6A. If the message is a call teardown message, the process proceeds the block 734 where the call teardown process begins. In block 736 it is determined whether all call legs in the call are inactive. If all calls are inactive, then the call teardown process proceeds to block 738 where the call is torn down. If, there are active calls, then the process ends and returns to FIG. 6A.

Figure 8:
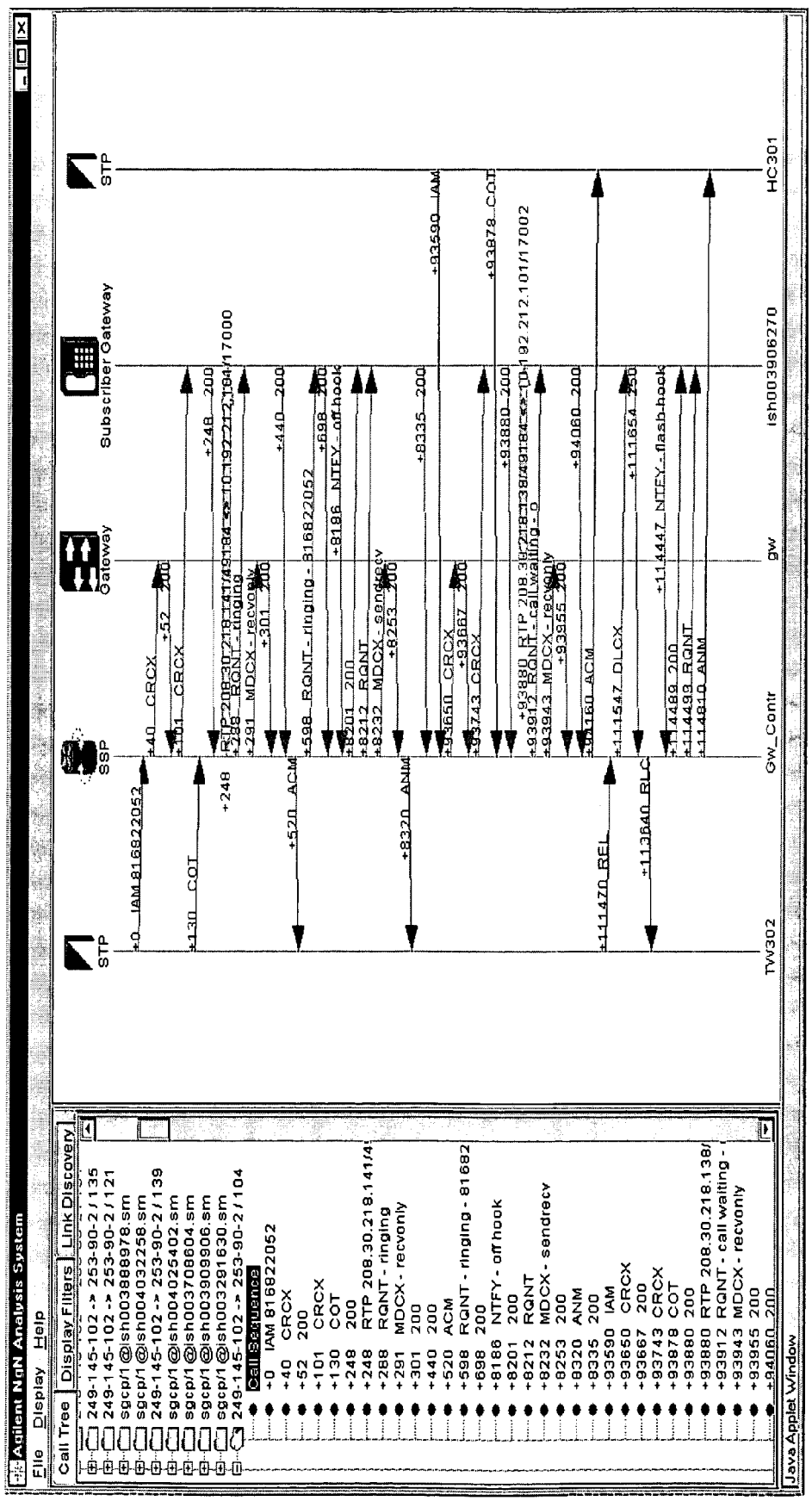
FIG. 8 is an example of a call flow record.

FIG. 8 is an example of a call flow record.

It will be apparent to those skilled in the art that many modifications and variations may be made to the preferred embodiments of the present invention, as set forth above, without departing substantially from the principles of the present invention. For example, the network analysis system can be used in any communication environment having at least two dissimilar communication signaling protocols. Furthermore, while illustrated using MGCP as the packet network signaling protocol, other signaling protocols, such as Internet Protocol Device Control (IPDC), Network-based Call Signaling (NCS), Transport Adapter Layer Interface (TALI), Signaling Transport (SIGTRAN), Simple Gateway Control Protocol (SGCP); and proprietary signaling protocols can be used by the embodiments of the invention to correlate the dissimilar signaling protocols. All such modifications and variations are intended to be included herein within the scope of the present invention, as defined in the claims that follow.

What is claimed is:

1. A system for remotely correlating and displaying dissimilar communication protocol identifiers in real time, comprising:
    user communication information carried on a network, where the user communication information is characterized by at least two dissimilar communication protocols;
    a first communication protocol associated with a first communication network;
    a second communication protocol associated with a second communication network; and
    an analysis device remote from and coupled to the first communication network and to the second communication network, the analysis device configured to passively detect external correlation key data identifying a first call portion associated with the first communication protocol, and configured to passively detect external correlation key data identifying a second call portion associated with the second communication protocol, the external correlation key data obtained by the analysis device, the external correlation key data characterizing a signaling message related to the first communication protocol and characterizing a signaling message related to the second communication protocol, where the external correlation key data is separate from the signaling message related to the first communication protocol and the signaling message related to the second communication protocol, where the external correlation key data comprises information identifying the first communication protocol and the second communication protocol, and wherein the external correlation key data is detected in real time and characterizes a single call.

2. The system of claim 1, wherein the external correlation key data allows the first call portion and the second call portion to be displayed to a user in real-time in a call flow record.

3. The system of claim 2, wherein the external correlation key data relates to a signaling protocol associated with the first communication protocol and the second communication protocol.

4. The system of claim 3, wherein the external correlation key data is supplied to an analysis device that is coupled to the first communication network and to the second communication network, and wherein the external correlation key data is supplied by a customer provided communication device.

5. The system of claim 4, wherein the external correlation key data comprises information relating to multiple telephone calls that span the dissimilar communication protocols.

6. The system of claim 2, wherein the external correlation key data identifies dissimilar signaling protocols related to a telephone call, and wherein a first signaling protocol complies with signaling system seven integrated services digital network user part (SS7 ISUP).

7. The system of claim 2, wherein the external correlation key data identifies dissimilar signaling protocols related to a telephone call, and wherein the second communication protocol complies with media gateway control protocol (MGCP).

8. A method for remotely correlating and displaying dissimilar communication protocol signaling messages, comprising:
    receiving communication information that spans at least two dissimilar communication networks;
    passively detecting in an analysis device remote from and coupled to the first communication network a first call identifier associated with a first communication protocol; and
    passively detecting in the analysis device external correlation key data identifying a first call portion associated with the first communication protocol, and a second call portion associated with a second communication protocol, the external correlation key data obtained by the analysis device, the external correlation key data characterizing a signaling message related to the first communication protocol and characterizing a signaling message related to the second communication protocol, where the external correlation key data is separate from the signaling message related to the first communication protocol and the signaling message related to the second communication protocol, where the external correlation key data comprises information identifying the first communication protocol and the second communication protocol, and wherein the external correlation key data is detected in real time and characterizes a single call.

9. The method of claim 8, further comprising displaying the first call portion and the second call portion to a user in real-time in a call flow record.

10. The system of claim 9, wherein the external correlation key data relates to a signaling protocol associated with the first communication protocol and the second communication protocol.

11. The method of claim 10, further comprising supplying the external correlation key data to an analysis device that is coupled to the dissimilar communication networks, and wherein the external correlation key data is supplied by a customer provided communication device.

12. The method of claim 11, wherein the external correlation key data comprises information relating to multiple telephone calls that span the dissimilar communication networks.

13. The method of claim 9, wherein the external correlation key data identifies dissimilar signaling protocols related to a telephone call, and wherein a first signaling protocol complies with signaling system seven integrated services digital network user part (SS7 ISUP).

14. The method of claim 9, wherein the external correlation key data identifies dissimilar signaling protocols related to a telephone call, and wherein the second communication protocol complies with media gateway control protocol (MGCP).

15. A computer readable medium having a stored program, the stored program comprising executable code for remotely correlating and displaying dissimilar communication protocol signaling messages, comprising:
  logic for receiving communication information that spans at least two dissimilar communication networks;
  logic for passively detecting a first call identifier associated with a first communication protocol; and
  logic for passively detecting in an analysis device remote from and coupled to the at least two dissimilar communication networks external correlation key data identifying a first call portion associated with the first communication protocol, and a second call portion associated with a second communication protocol, the external correlation key data obtained by an analysis device, the external correlation key data characterizing a signaling message related to the first communication protocol and characterizing a signaling message related to the second communication protocol, where the external correlation key data is separate from the signaling message related to the first communication protocol and the signaling message related to the second communication protocol, where the external correlation key data comprises information identifying the first communication protocol and the second communication protocol, and wherein the correlation data is detected in real time and characterizes a single call.

16. The program of claim 15, further comprising logic for displaying the first call portion and the second call portion to a user in real-time in a call flow record.

17. The program of claim 16, further comprising logic for supplying the external correlation key data to an analysis device that is coupled to the dissimilar communication networks, and wherein the external correlation key data is supplied by a customer provided communication device.

18. The program of claim 17, wherein the external correlation key data comprises information relating to multiple telephone calls that span the dissimilar communication networks.

19. The program of claim 16, wherein the external correlation key data identifies dissimilar signaling protocols related to a telephone call, and wherein a first signaling protocol complies with signaling system seven integrated services digital network user part (SS7 ISUP).

20. The program of claim 16, wherein the external correlation key data identifies dissimilar signaling protocols related to a telephone call, and wherein the second communication protocol complies with media gateway control protocol (MGCP).

21. A system for remotely correlating and displaying dissimilar communication protocol identifiers in real time, comprising:
  user communication information carried on a network, where the user communication information is characterized by at least two dissimilar communication protocols;
  a first communication protocol associated with a first communication network;
  a second communication protocol associated with a second communication network; and
  an analysis device remote from and coupled to the first communication network and to the second communication network, the analysis device configured to passively detect external correlation key data identifying a first call portion associated with the first communication protocol, and configured to passively detect external correlation key data identifying a second call portion associated with the second communication protocol, the external correlation key data obtained by an analysis device, the external correlation key data characterizing a signaling message related to the first communication protocol and characterizing a signaling message related to the second communication protocol, where the external correlation key data is separate from the signaling message related to the first communication protocol and the signaling message related to the second communication protocol, where the external correlation key data comprises information identifying the first communication protocol and the second communication protocol, wherein the external correlation key data is passively detected in real time, and wherein the first communication protocol is SS7 and the second communication protocol is internet protocol (IP).

* * * * *